(12) United States Patent
Thooris et al.

(10) Patent No.: US 10,225,391 B2
(45) Date of Patent: Mar. 5, 2019

(54) METHOD AND SYSTEM FOR EXCHANGING DATA BETWEEN USERS OF A VEHICLE

(71) Applicant: DURA AUTOMOTIVE SYSTEMS SAS, Bievres (FR)

(72) Inventors: Arnaud Georges Thooris, Meudon (FR); Mickaël Roches, Saint Remy les Chevreuse (FR)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 15/441,923

(22) Filed: Feb. 24, 2017

(65) Prior Publication Data

US 2017/0251094 A1 Aug. 31, 2017

(30) Foreign Application Priority Data

Feb. 29, 2016 (FR) ...................................... 16 51672

(51) Int. Cl.
*H04M 1/725* (2006.01)
*G07C 9/00* (2006.01)
(Continued)

(52) U.S. Cl.
CPC ....... *H04M 1/72525* (2013.01); *B60R 25/241* (2013.01); *B60R 25/243* (2013.01);
(Continued)

(58) Field of Classification Search
CPC ... H04M 1/72525; H04W 4/80; H04W 12/06; H04W 4/20; H04L 67/125; H04L 63/08;
(Continued)

(56) References Cited

U.S. PATENT DOCUMENTS 8,863,255 B2 * 10/2014 Zarfoss, III ............. H04L 63/08
713/155
9,189,900 B1 11/2015 Penilla et al.
(Continued)

FOREIGN PATENT DOCUMENTS

WO WO2014146196 A1 9/2014

OTHER PUBLICATIONS

French Search Report for French Serial No. 1651672 dated Jun. 30, 2016, 8 pages.

*Primary Examiner* — Joseph E Dean, Jr.
(74) *Attorney, Agent, or Firm* — Reising Ethington P.C.

(57) ABSTRACT

This disclosure relates to a method and system for exchanging data between users of a vehicle, including a main user equipped with a first personal electronic device and a secondary user equipped with a second personal electronic device. The method includes a preparatory phase and a transmission phase, which comprise the following steps: the application installed on the first personal electronic device sends data to a remote server including the second email address of the secondary user and instructions for the transfer of information regarding the vehicle; the remote server sends data to an information cloud including the mobile identifier assigned to the application installed on the second device and information regarding the vehicle, and the cloud sends information regarding the vehicle to the application installed on the second personal electronic device.

10 Claims, 3 Drawing Sheets

(51) Int. Cl.

| | | |
|---|---|---|
| *H04W 4/80* | (2018.01) | |
| *H04W 4/20* | (2018.01) | |
| *H04L 29/08* | (2006.01) | |
| *H04L 29/12* | (2006.01) | |
| *G07B 15/00* | (2011.01) | |
| *B60R 25/01* | (2013.01) | |
| *B60R 25/24* | (2013.01) | |
| *H04L 29/06* | (2006.01) | |
| *H04W 12/06* | (2009.01) | |

(52) U.S. Cl.
CPC ..... *G07C 9/00309* (2013.01); *G07C 9/00571* (2013.01); *H04L 61/307* (2013.01); *H04L 63/062* (2013.01); *H04L 63/08* (2013.01); *H04L 67/125* (2013.01); *H04W 4/20* (2013.01); *H04W 4/80* (2018.02); *H04W 12/06* (2013.01); *B60R 25/01* (2013.01); *B60R 2325/20* (2013.01); *G07B 15/00* (2013.01); *G07C 2009/00325* (2013.01)

(58) Field of Classification Search
CPC . H04L 63/062; H04L 61/307; G07C 9/00309; G07C 2009/00325; B60R 25/241; B60R 25/243; B60R 25/01; B60R 2325/20
See application file for complete search history.

(56) References Cited

U.S. PATENT DOCUMENTS

| | | | |
|---|---|---|---|
| 2013/0259232 A1 | 10/2013 | Petel | |
| 2015/0143468 A1* | 5/2015 | Hebert | H04L 63/10 726/4 |
| 2015/0210287 A1* | 7/2015 | Penilla | B60W 40/08 701/49 |

* cited by examiner

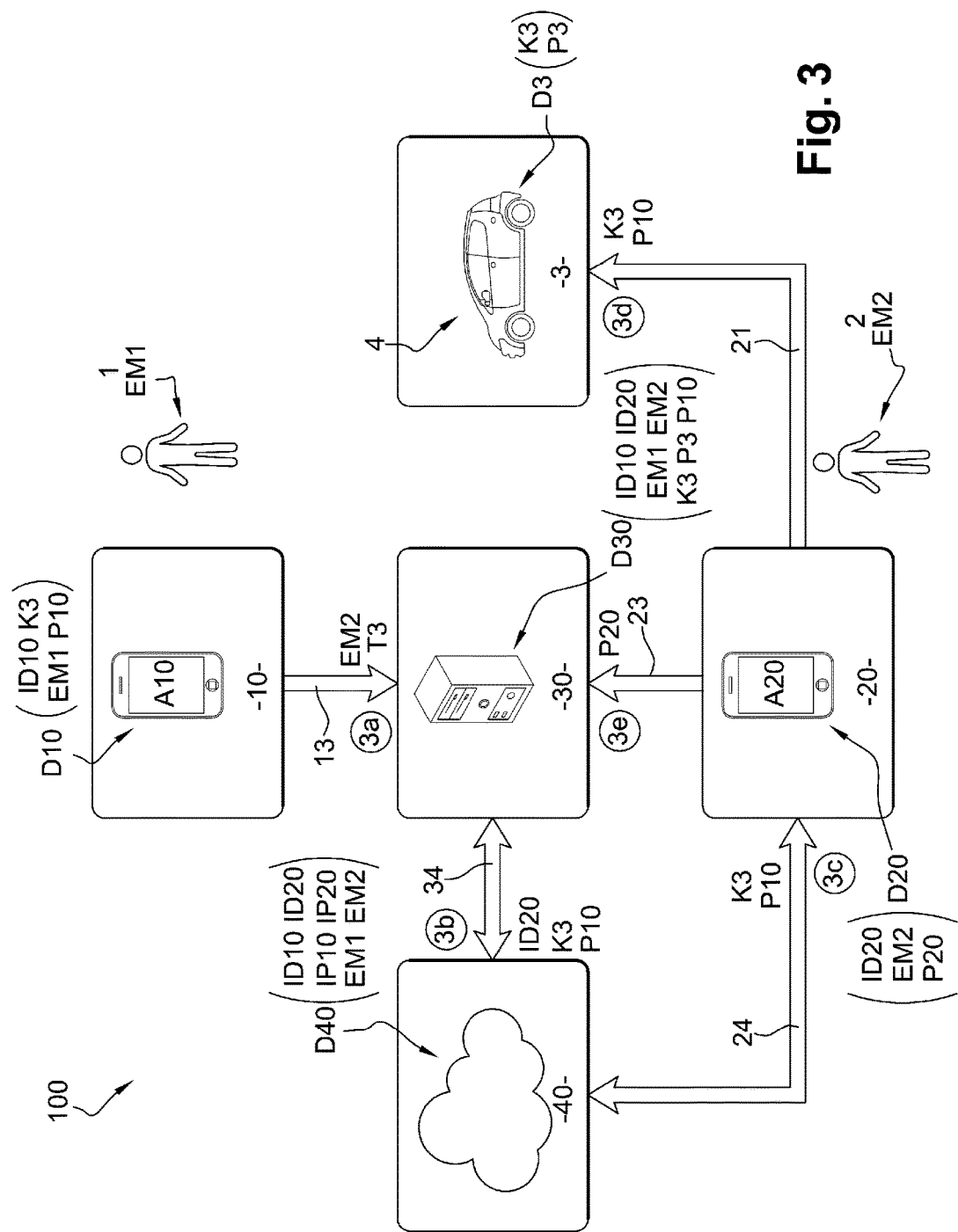

METHOD AND SYSTEM FOR EXCHANGING DATA BETWEEN USERS OF A VEHICLE

CROSS REFERENCE TO RELATED APPLICATIONS

This application claims priority to French Patent Application No.: FR1651672 filed Feb. 29, 2016. The content of this priority application is incorporated herein by reference in its entirety.

TECHNICAL FIELD

The present disclosure relates to a method and a system for exchanging data between users of a vehicle, preferably equipped with a keyless entry system.

The disclosure further relates generally to exchanging information regarding automotive vehicles, in particular exchanging information for the sharing of a vehicle equipped with a keyless entry system.

BACKGROUND

In a known manner, such a keyless entry system is paired with an electronic card carried by a user of the vehicle. This card is configured to establish a wireless link with the keyless entry system, authorizing the user to access the vehicle, when the card is at a preset distance from the system.

Currently, the use of a mobile telephone as a replacement for an electronic card is known. A dedicated application is installed on the telephone in such a way as to establish a wireless link with the keyless entry system. The number of electronic devices carried by the driver can thus be reduced.

In practice, several users can take turns borrowing and driving a single vehicle. To exchange an electronic card requires the users thereof to physically meet.

On the other hand, a physical meeting is not required in order to exchange a digital identification key with which to access the vehicle. Such an exchange can be performed, for example, by means of the mobile telephones of the users.

The digital identification key is however complex. Said key comprises several tens of encrypted characters that are meaningless to the users. Copying said key "manually" in an SMS or an email is absolutely impractical for a user especially given that the complexity of the key is a source of errors within said copies. Similarly, retrieving the key from an SMS or an email for inserting it into a smartphone application is not easy for everyone.

At least one object of at least certain implementations or embodiments of the present invention is to propose an improved method and system for exchanging data about an automotive vehicle.

To that purpose, at least one object of at least certain implementations or embodiments of the invention is a method of exchanging data between users of a vehicle, including a main user having a first personal electronic device and a secondary user having a second personal electronic device, wherein the method includes a preparatory phase comprising the following steps:

1a) A first email address belonging to the main user is entered into the first personal electronic device and a dedicated application is installed on the first personal electronic device;

1b) The application installed on the first personal electronic device connects to an information cloud;

1c) The cloud assigns a first mobile identifier to the application installed on the first personal electronic device;

1d) The application installed on the first personal electronic device sends data to a remote server including the first email address and the first mobile identifier;

2a) A second email address belonging to the secondary user is entered into the second personal electronic device and a dedicated application is installed on the second personal electronic device;

2b) The application installed on the second personal electronic device connects to the cloud;

2c) The cloud assigns a second mobile identifier to the application installed on the first personal electronic device;

2d) The application installed on the second personal electronic device sends data to the remote server including the second email address and the second mobile identifier;

The method additionally includes a transmission phase comprising the following steps:

3a) The application installed on the first personal electronic device sends data to the remote server including the second email address and instructions for the transfer of information regarding the vehicle;

3b) The remote server sends data to the cloud including the second mobile identifier and information regarding the vehicle;

3c) The cloud sends information regarding the vehicle to the application installed on the second personal electronic device.

The disclosure thus describes ways to allow for the practical, effective and secure exchange of data regarding the vehicle. With the subject matter of this disclosure, said exchanges can be automated without the users having to worry about the digital identification key. All of these exchanges are performed by means of dedicated applications running on the personal electronic devices. The only data handled by the users are email addresses, which are common and relatively simple.

SUMMARY

Other advantageous characteristics of the subject matter of this disclosure, taken separately or in combination, will appear upon reading the following description.

Preferably in step 3c), the cloud uses the second mobile identifier in order to identify a provisional identifier temporarily assigned to the second personal electronic device, such as an IP address, and subsequently uses said provisional identifier in order to send information regarding the vehicle to the second personal electronic device.

According to a preferred embodiment, the preparatory phase also includes a step 1e) wherein the remote server sends certain data regarding the vehicle to the first personal electronic device. In particular, these data can be sent to the dedicated application installed on the first personal electronic device.

According to a specific embodiment, the information regarding the vehicle comprises customizable vehicle parameters, including for example the positions of the seats, adjustment of the air conditioning and heating system and programming of the radio.

According to an advantageous embodiment, the vehicle is equipped with a keyless entry system. In this case, the information regarding the vehicle includes an identification key. Once received by the application installed on the first personal electronic device or on the second personal electronic device, the identification key authorizes the connection of this first or second personal electronic device to the keyless entry system for accessing the vehicle.

Preferably, the first personal electronic device is a mobile telephone. Alternatively, the first personal electronic device is an electronic watch, a digital tablet or a passive entry card.

Likewise, preferably, the second personal electronic device is a mobile telephone. Alternatively, the second personal electronic device is an electronic watch, a digital tablet or a passive entry card.

At least one object of at least certain implementations or embodiments of the invention is also a system for exchanging data between users of a vehicle including a main user and a secondary user. The system comprises:

A vehicle drivable by the main or secondary user;

A first personal electronic device carried by the main user and configured for storing a first email address belonging to the main user and for running a dedicated application;

A second personal electronic device carried by the secondary user and configured for storing a second email address belonging to the secondary user and for running a dedicated application;

An information cloud configured for assigning both a first mobile identifier to the application installed on the first personal electronic device and also a second mobile identifier to the application installed on the second personal electronic device;

A remote server configured for storing data including the first email address and the first mobile identifier received from the first personal electronic device and also the second email address and second mobile identifier received from the second personal electronic device; and A communication chain from the first personal electronic device to the second personal electronic device, configured such that when the application installed on the first personal electronic device sends data to the remote server, including the second email address and instructions for the transfer of information regarding the vehicle, then the remote server sends data to the cloud including the second mobile identifier and information regarding the vehicle, and then the cloud sends information regarding the vehicle to the application installed on the second personal electronic device.

At least one object of at least certain implementations or embodiments of the invention is also a software application, configured in such a way as to be installed and executed on a personal electronic device wherein the application comprises code segments for the execution of steps 1b) to 1d) or 2b) to 2d) and code segments for the execution of steps 3a) and/or 3c), from the method defined above, when the application is executed on the personal electronic device.

Preferably, the application has code segments for the execution of steps 1e), 1f) and 3d) detailed below.

BRIEF DESCRIPTION OF THE ACCOMPANYING DRAWINGS

The subject matter disclosed herein will be better understood upon reading the following description, given solely as a non-limiting example, and made with reference to the accompanying figures in which:

FIGS. 2 and 3 are schematic representations analogous to FIG. 1 showing respectively the preparatory step and the transmission phase of the method for exchanging data.

DETAILED DESCRIPTION

Figure 1:
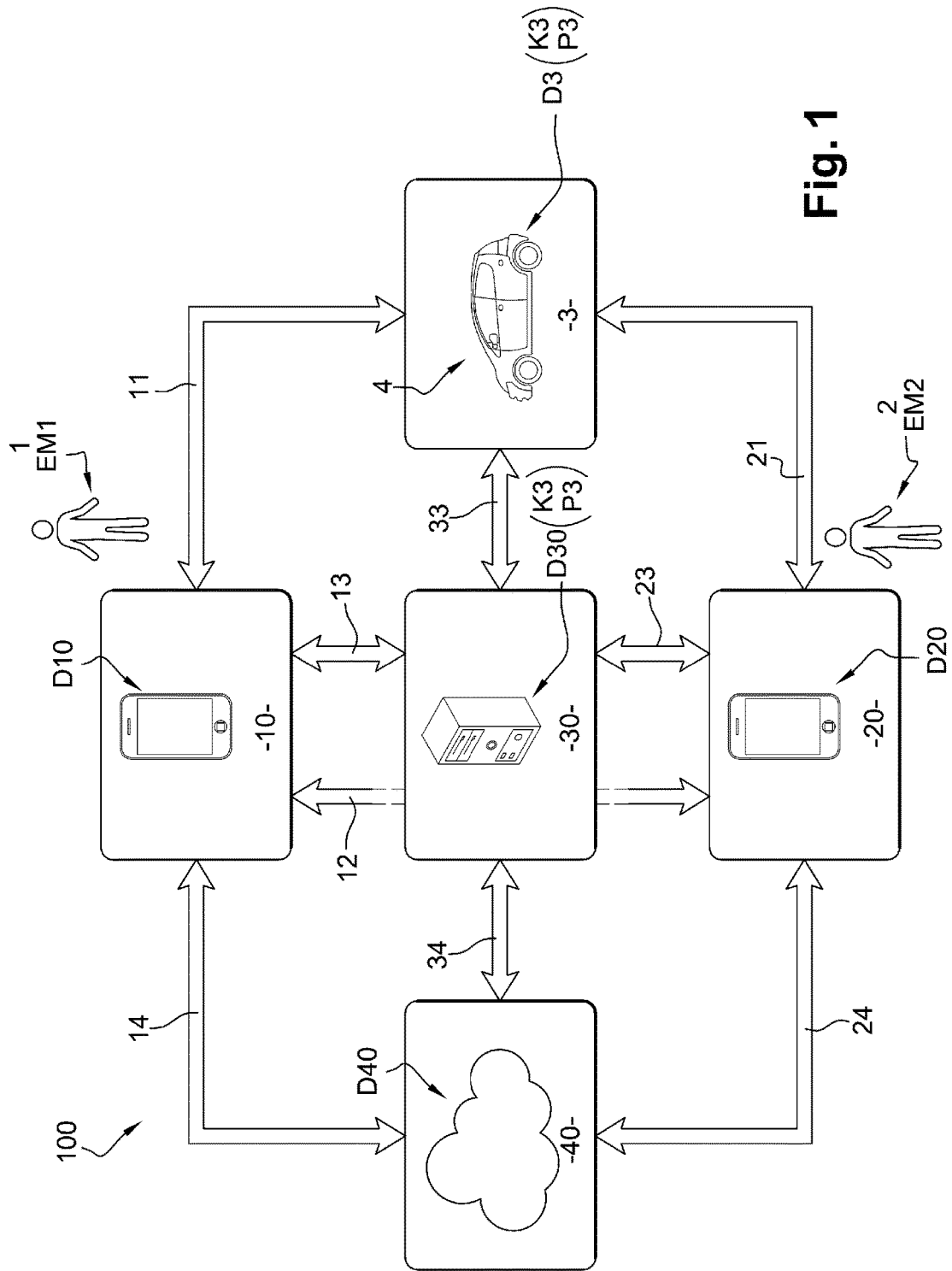
FIG. 1 is a schematic representation of a data exchange system 100.
Figure 2:
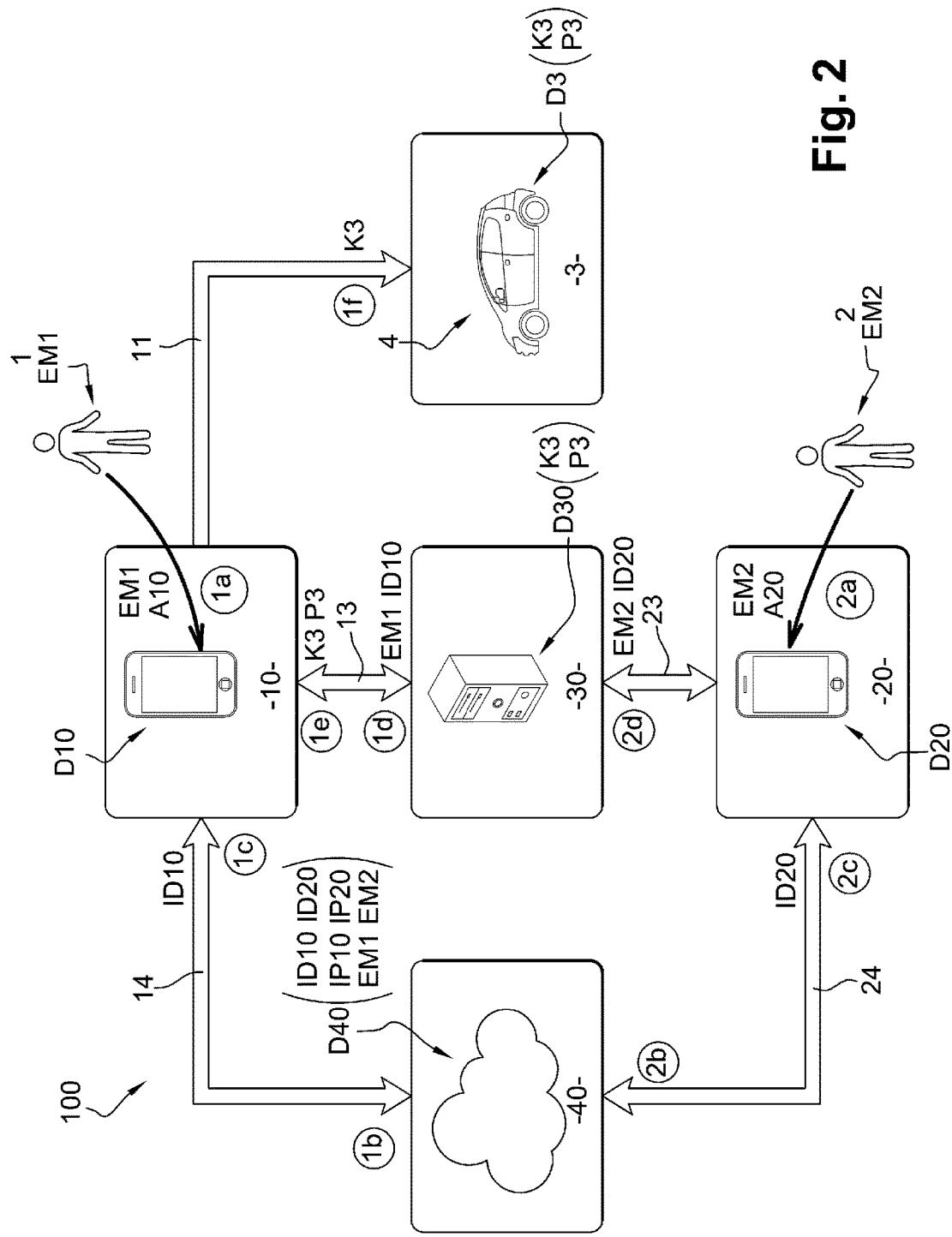

In the preferred embodiment shown in FIGS. 1 to 3, the system 100 comprises an automotive vehicle 3, a first mobile telephone 10, a second mobile telephone 20, a remote data server 30 and the information cloud 40.

The vehicle 3 is designed to be driven by a user who is then the driver. The vehicle 3 is alternately drivable by various users, including a main user 1 and a secondary user 2.

Generally, the main user 1 is the owner of the vehicle 3 whereas the secondary user 2 is a colleague, friend or family member of the main user 1.

The telephone 10 belongs to user 1 whereas the telephone 20 belongs to user 2.

The vehicle 3 comprises adjustable parameters P3, which are customizable by users 1 and 2. As an example, these parameters P3 can include the position of the seats, the adjustment of the air conditioning and heating system and programming of the radio. Other vehicle 3 parameters P3 can be customized without going beyond the scope of the invention.

The vehicle 3 is equipped with a keyless entry system 4. The system 4 can be used to automatically open and close openings of the vehicle 3 by the user 1 or 2 without inserting a key inserted into a lock. The openings include the doors and trunk of the vehicle 3.

A digital identification key K3 is instead paired with the vehicle 3, more specifically the system 4. Once received from the server 30 by the telephone 10, this key K3 authorizes a telephone connection 10 with the system 4 such that the user 1 can access the vehicle 3. Likewise, once received by the telephone 20, under certain conditions, as defined below, the key K3 authorizes a telephone connection 20 with the system 4 such that the user 2 can access the vehicle 3.

Initially, the key K3 is securely saved in the system 4 and on the server 30.

The telephones 10 and 20 are smartphones configured in such a way as to communicate by means of various wireless communications standards (in particular LTE, NFC, Bluetooth, Wi-Fi, etc.) and for running various applications.

In the context of at least certain implementations, each of the telephones 10 and 20 constitutes a personal electronic device, which is carried by the respective user 1 or 2 thereof.

As explained below, the telephones 10 and 20 can connect to the keyless entry system 4 of the vehicle 3 preferably via a dedicated application. The application carries the reference A10 on telephone 10 and A20 on telephone 20; it is understood that a single software application is involved. The telephones 10 and 20 can also connect to the server 30 through this same application A10 or A20. The telephones 10 and 20 can furthermore connect to the cloud 40 through other applications, such as an internet navigation system for example.

The server 30 is dedicated to the storage of data regarding vehicle 3, in particular the identification key K3 and also data regarding the telephones 10 and 20 configured to connect to the vehicle 3.

The key K3 is sent by the server 30 to the telephone 10 when the user 1 installs the application A10 on their telephone 10 and identifies themselves to the server 30 as the main user of the vehicle 3.

In contrast, given that user 2 is not the main user of the vehicle 3, the server 30 cannot send the key K3 directly to the telephone 20 in order to allow it to access the vehicle 3.

After installation of the application A10, the telephone 10 is configured in such a way as to establish a wireless link 13 with the server 30. Likewise, after the installation of the application A20, the telephone 20 is configured in such a way as to establish a wireless communication link 23 with the server 30. The communications links 13 and 23 preferably use a Wi-Fi or LTE standard or any other advanced mobile standard.

The user 1 can download initialization parameters, specific to the vehicle 3, from the server 30 to their telephone 10. Subsequently, the user parameters P10 saved in the telephone 10 include the initialization parameters.

In practice, the telephone 10 initialization parameters are required in at least certain implementations in order to establish the communications link 10 with the vehicle 3. This initialization parameters comprises the Bluetooth address of the vehicle 1 and the identification key K3. The communications link 11 is thereby automatically established when the telephone 10 is at a set distance from the system 4 and comprises the initialization parameters downloaded from the server 30, including the key K3.

The initialization parameters can also include default values corresponding to the adjustable parameters P3 of the vehicle 3 such as the position of the seats, adjustment of the air conditioning and heating system and programming of the radio.

Other initialization parameters can be provided without going beyond the scope of the invention.

After the installation of the dedicated application A10 and the retrieval of the key K3, the telephone 10 is configured in such a way as to establish a wireless communications link 11 with the vehicle 3. Similarly, after the installation of the dedicated application A20, the telephone 20 is configured in such a way as to establish a wireless communications link 21 with the vehicle 3 but does not have the key K3, in so far as the user 2 is not the main user of the vehicle 3. Preferably the communications links 11 and 21 use an NFC standard ("Near Field Communication") and/or a Bluetooth standard.

The telephone 10 is configured in such a way as to transmit the key K3 to the system 4 through the application A10 and the communications link 11, in order to authorize the user 1 to access the vehicle 3. In this case, the communications link 11 uses the NFC standard and the data exchanges are secure. Preferably, the communications link 11 is established automatically when the telephone 10 is at a set distance from the system 4.

Similarly, when the telephone 20 effectively disposes of the key K3, the telephone 20 can send said key K3 to the system 4 by means of the application A20 and the communications link 21.

User parameters P10 corresponding to the adjustable parameters P3 of the vehicle 3 can be saved in the telephone 10. More specifically, the user parameters P10 is saved in the application A10. The telephone 10 is configured in such a way as to update the parameters P3 of the vehicle 3 with the user parameters P10 thereof by means of the application A10 and the communications link 11. In this case, the communications link 11 uses the Bluetooth standard. When the user changes the parameters P3 of the vehicle 3 during use, whether stopped or in motion, the parameters P10 are automatically updated within the telephone 10 via the communications link 11. Additionally, the parameters P10 can be modified by the user directly on the telephone 10, for example by means of the application A10.

Similarly, the user parameters P20 corresponding to the adjustable parameters P3 of the vehicle 3 can be saved in the telephone 20. More specifically, the user parameters P20 are saved in the application A20.

The cloud 40 is a collection of interconnected hardware, networks and software that is accessible from anywhere in the world.

The cloud 40 can be the service offered by a service provider such as Google or Apple.

Similarly, the telephone 10 is configured in such a way as to establish a wireless communications link 14 with the server 40. Similarly, the telephone 20 is configured in such a way as to establish a wireless communications link 24 with the server 40. The communications links 14 and 24 preferably use a Wi-Fi or LTE standard or any other advanced mobile standard.

The telephones 10 and 20 are configured in such a way as to establish a wireless communications link 12 with each other. The communications link 12 uses a GSM, LTE or any other mobile standard. Said communications link 12 is however limited to telephone calls and to sending SMS and MMS messages.

For more complex data exchanges, for example emails, the telephones 10 and 20 can connect to the cloud 40 via communications links 14 and 24.

For some specific data exchanges, in particular regarding the vehicle 3, the telephones 10 and 20 can connect to the server 30 by means of the communications links 13 and 23.

In practice, the system 100 can be configured differently from FIGS. 1 to 3 without going beyond the scope of the invention.

As a variant, the telephone 10 and/or 20 can be replaced by an electronic watch, a digital tablet or a passive entry card thus forming the personal electronic device having the characteristics described above for the telephone 10. Other personal electronic devices can be implemented without going beyond the scope of the invention.

According to another variant, the system 100 can comprise more than two personal electronic devices 10 and 20 paired with the system 4 equipping the vehicle 3.

According to another variant, the system 100 can comprise several vehicles 3 equipped with keyless entry devices 4 paired with the same telephone 10.

The method according to at least certain implementations or embodiments of the invention for exchanging data between the users 1 and 2 of the vehicle 3 includes a preparatory phase and a transmission phase. This method is specified below with reference to FIGS. 2 and 3 and to Tables 1 to 5:

Table 1 shows the various data implemented within the method according to at least certain implementations or embodiments of the invention;

Table 2 shows the data saved by each entity at the beginning of the preparatory step;

Table 3 shows the data saved by each entity at the end of the preparatory step;

Table 4 shows the data saved by each entity at the beginning of the transmission phase; and Table 5 shows the data saved by each entity at the end of the transmission phase.

TABLE 1

Data implemented

| Reference | Explanation |
|---|---|
| D3 | Information regarding the vehicle 3 |
| D10 | Data saved in the telephone 10 |
| D20 | Data saved in the telephone 20 |
| D30 | Data saved on the server 30 |
| D40 | Data saved in the cloud 40 |
| EM1 | Email address of the main user 1 |
| EM2 | Email address of the secondary user 2 |
| ID10 | Mobile identifier assigned to the application A10 of the telephone 10 |
| ID20 | Mobile identifier assigned to the application A20 of the telephone 20 |
| IP10 | Provisional identifier temporarily assigned to the telephone 10 |
| IP20 | Provisional identifier temporarily assigned to the telephone 20 |
| K3 | Identification key allowing a mobile telephone 10 or 20 to access the vehicle 3 |
| P3 | Customizable parameters of vehicle 3 |
| P10 | Customized parameters for user 1 |
| P20 | Customized parameters for user 2 |

The preparatory phase includes steps 1a), 1b), 1c) and 1d) relating to user 1 and telephone 10 and steps 2a), 2b), 2c) and 2d) relating to user 2 and telephone 20.

In step 1a), the email address EM1 of user 1 is saved in telephone 10 and the application A10 is installed in telephone 10. More specifically, the email address EM1 is saved manually by the user 1 and the installation A10 is downloaded from the Internet.

In step 1b), the application A10 installed on the telephone 10 connects to the cloud 40.

In step 1c), the cloud 40 assigns a permanent mobile identifier ID10 to the application A10 installed on the telephone and a provisional mobile identifier IP10 to the telephone 10. The identifier ID10 is referred to as permanent in that it is definitively assigned to the application A10, unless it is uninstalled from the telephone 10. The identifier IP10 is referred to as provisional in that it is temporarily assigned to the telephone 10 depending upon the geographic location thereof. The identifier IP10 depends in particular upon the cell site to which the telephone is connected.

Conventionally, the steps 1b) and 1c) are performed when the application A10 first starts immediately after installation thereof on the telephone 10 by the user 1.

Preferably step 1b) is performed automatically after step 1a), and step 1c) is performed automatically after step 1b). In other words, the steps 1a), 1b) and 1c) are successive in that order.

In step 1d), the application A10 sends data including the email address EM1 and identifier ID10 to the server 30.

Step 1d) is always performed after steps 1a), 1b) and 1c).

After step 1d), a step 1e) can be performed wherein the server 30 sends certain data regarding the vehicle 3, including the identification key K3 and the customizable parameters P3, to the telephone 10 and more specifically to the application A10.

After step 1e), a step 1f) can be performed wherein the user 1 accesses the vehicle 3 with the telephone 10, more specifically using the application A10 and the key K3.

The steps 2a) to 2d) are similar to steps 1a) to 1d) described above, except that they involve the user 2, the telephone 20 and the application A20, instead of involving the user 1, the telephone 10 and the application A10.

On the other hand, the steps 1e) and 10 do not apply to user 2 who is not the main user of the vehicle 3. For that reason, the server 30 cannot send the key K3 directly to the telephone 20 in order to allow it to access the vehicle 3.

TABLE 2

Beginning of the preparatory step

| Entity | Data stored |
|---|---|
| 1 | EM1, (EM2) |
| 2 | EM2, (EM1) |
| D3 | K3, P3 |
| D10 | |
| D20 | |
| D30 | K3, P3 |
| D40 | (EM1, EM2) |

TABLE 3

End of the preparatory step

| Entity | Data stored |
|---|---|
| 1 | EM1, (EM2) |
| 2 | EM2, (EM1) |
| D3 | K3, P3, P10 |
| D10 | ID10, EM1, K3, P3, P1 |
| D20 | ID20, EM2 |
| D30 | ID10, ID20, EM1, EM2, K3, P3, P10 |
| D40 | ID10, ID20, IP10, IP20, (EM1, EM2) |

The transmission phase comprises step 3a), 3b) and 3c), which can only be performed once steps 1d) and 2d) have been performed. Additionally, user 1 must have the email address EM2 of user 2.

In a known way, user 1 has the possibility of exchanging data with user 2 either by means of the communications link 22 or by means of the communication chain 14+24.

However, for exchanging information regarding the vehicle 3, it is more practical and more secure to use the dedicated application A10/A20 installed on the telephones 10 and 20 and to have these data pass through the communication chain 13+34+24.

For that purpose, user 1 manually and intentionally initiates the transmission phase given in detail below.

In step 3a), the application A10 installed on the telephone 10 sends data to the server 30 including the email address EM2 and instructions for the transfer T3 of the information K3 and/or P10 regarding the vehicle 3.

In step 3b), in response to the instructions T3, the server 30 sends data to the cloud 40 including the mobile identifier ID20 and information K3 and/or P10 regarding the vehicle 3.

In step 3c), the cloud 40 sends the information K3 and/or P10 regarding the vehicle 3 to the application A20 installed on the telephone 20.

Advantageously, at each step of the transmission the information is encrypted.

According to a preferred embodiment of step 3c), the cloud 40 uses the permanent identifier ID20 in order to identify the provisional identifier IP20 currently assigned to the second personal electronic device 20. The cloud 40 next uses this provisional identifier IP20 to send the information K3 and/or P10 regarding the vehicle 3 to the telephone 20.

Preferably in steps 3a) to 3c), the information regarding the vehicle 3 comprises at least the identification key K3.

In this case, after the step 3c), a step 3d) can be performed wherein the user 2 accesses the vehicle 3 with the telephone 20, more specifically using the application A10 and the key K3.

As an alternative or additionally, the information regarding the vehicle 3 can include the customized parameters P10 defined by the user 1.

Other information regarding the vehicle 3 can be sent by means of implementing the methods defined above without going beyond the scope of the invention.

The disclosed subject matter thereby allows for the practical, effective and secure exchange of data between users.

Said exchange is more complex than sending an SMS or email, but requires fewer manual user operations using the dedicated application and is also more secure.

TABLE 4

Beginning of the transmission phase

| Entity | Data stored |
|---|---|
| 1 | EM1, EM2 |
| 2 | EM2, (EM1) |
| D3 | K3, P3, P10 |
| D10 | ID10, EM1, K3, P3, P10 |
| D20 | ID20, EM2 |
| D30 | ID10, ID20, EM1, EM2, K3, P3, P10 |
| D40 | ID10, ID20, IP10, IP20, (EM1, EM2) |

TABLE 5

End of the transmission phase

| Entity | Data stored |
|---|---|
| 1 | EM1 |
| 2 | EM2 |
| D3 | K3, P3, P20 |
| D10 | ID10, EM1, K3, P3, P10 |
| D20 | ID2, EM2, K3, P10, P20 |
| D30 | ID10, ID20, EM1, EM2, K3, P3, P10, P20 |
| D40 | ID1, ID2, IP1, IP2, (EM1, EM2) |

In practice, the technical characteristics of the various embodiments and variants mentioned above can, as a whole or in part, be combined with each other.

The method and the system for exchanging data can thus be adapted in terms of cost, ergonomics, functionality and performance.

The invention claimed is:

1. A method of exchanging data between users of a vehicle, including a main user having a first personal electronic device and a secondary user having a second personal electronic device, wherein the method includes a preparatory step comprising the following steps:
   1a) A first email address belonging to the main user is entered into the first personal electronic device, and a dedicated application is installed on the first personal electronic device;
   1b) The application installed on the first personal electronic device connects to an information cloud;
   1c) The cloud assigns a first mobile identifier to the application installed on the first personal electronic device;
   1d) The application installed on the first personal electronic device sends data to a remote server including the first email address and the first mobile identifier;
   2a) A second email address belonging to the secondary user is entered into the second personal electronic device, and a dedicated application is installed on the second personal electronic device;
   2b) The application installed on the second personal electronic device connects to the cloud;
   2c) The cloud assigns a second mobile identifier to the application installed on the second personal electronic device;
   2d) The application installed on the second personal electronic device sends data to a remote server including the second email address and the second mobile identifier;
   wherein the second email address belonging to the secondary user is transmitted to the main user;
   The method additionally includes a transmission phase comprising the following steps:
   3a) The application installed on the first personal electronic device sends data to the remote server including the second email address and instructions for transfer of information regarding the vehicle;
   3b) The remote server sends data to the cloud including the second mobile identifier and information regarding the vehicle;
   3c) The cloud sends the information regarding the vehicle to the application installed on the second personal electronic device.

2. The method according to claim 1, wherein in step 3c), the cloud uses the second mobile identifier in order to identify a provisional identifier temporarily assigned to the second personal electronic device and then uses this provisional identifier in order to send information regarding the vehicle to the second personal electronic device.

3. The method according to claim 1, wherein the preparatory step also includes a step 1e) wherein the remote server sends the first personal electronic device certain data regarding the vehicle.

4. The method according to claim 1, wherein the information regarding the vehicle comprises customizable parameters regarding the vehicle, including for example the positions of the seats, adjustment of the air conditioning and heating system and programming of the radio.

5. The method according to claim 1, wherein the vehicle is equipped with a keyless entry system and that the information regarding the vehicle includes an identification key which, once received by the application installed on the first personal electronic device or the second personal electronic device, authorizes a connection with the keyless entry system for accessing the vehicle.

6. The method according to claim 1, wherein the first personal electronic device and/or the second personal electronic device is a mobile telephone.

7. The method according to claim 1, wherein the first personal electronic device and/or the second personal electronic device is an electronic watch.

8. The method according to claim 1, wherein the first personal electronic device and/or the second personal electronic device is a digital tablet.

9. A system for exchanging data between users of a vehicle, including a main user and a secondary user, the system comprising:
   a vehicle drivable by the main user or the secondary user;
   a first personal electronic device carried by the main user and configured for storing a first email address belonging to the main user and for running a dedicated application;
   a second personal electronic device carried by the secondary user and configured for storing a second email address belonging to the secondary user and for running a dedicated application;
   an information cloud comprising a collection of interconnected hardware, networks and software, configured for assigning both a first mobile identifier to the application installed on the first personal electronic device and also a second mobile identifier to the application installed on the second personal electronic device;

a remote server configured for storing data including the first email address and the first mobile identifier received from the first personal electronic device and also the second email address and second mobile identifier received from the second personal electronic device; and a communication chain from the first personal electronic device to the second personal electronic device, configured such that when the application installed on the first personal electronic device sends data to the remote server including the second email address and instructions for the transfer of information regarding the vehicle, the remote server subsequently sends data to the cloud including the second mobile identifier and information regarding the vehicle, and then the cloud sends information regarding the vehicle to the application installed on the second personal electronic device.

10. A software application, configured to be installed and executed on a personal electronic device where the application comprises code segments for the execution of steps 1b) to 1d) or 2b) to 2d) and code segments for the execution of steps 3a) and/or 3c), from the method according to claim 1, when the application is executed on the personal electronic device.

* * * * *